FM MULTIPLEX SYSTEM FOR TRANSMITTING RADIO SIGNALS FROM A STEREOPHONIC PHONOGRAPH

Filed Dec. 22, 1966

Inventor:
Gunther E. Fenner,
by Marvin Snyder
His Attorney.

3,360,609

FM MULTIPLEX SYSTEM FOR TRANSMITTING RADIO SIGNALS FROM A STEREOPHONIC PHONOGRAPH

Gunther E. Fenner, Schenectady, N.Y., assignor to General Electric Company, a corporation of New York Filed Dec. 22, 1966, Ser. No. 604,022
8 Claims. (Cl. 179—15)

ABSTRACT OF THE DISCLOSURE

A low power FM multiplex system for transmitting radio signals from a stereophonic phonograph. The phonograph pick-up utilizes piezoresistive elements to produce outputs corresponding to both the sum and difference frequencies of the left and right channels. The sum and difference frequencies along with a 19 kc. pilot frequency are combined to frequency modulate a low power FM transmitter.

*Background of the invention*

This invention relates to radio broadcasting apparatus, and more particularly to frequency modulated multiplex stereophonic phonograph transmitting systems.

Recent advances in radio broadcasting technology have resulted in what is now known as the FM multiplex system, which enables transmission of two information channels on a single carrier frequency in the FM band. This system preserves to the owner of an older monaural FM receiver full utility for receiving a single information channel on his apparatus, while allowing those interested in reception of greater realism to utilize either a multiplex receiver or a monaural receiver plus an adapter circuit to extract both information channels, enabling stereophonic reproduction of those programs of entertainment broadcast stereophonically.

There are presently available and in use a wide variety of stereophonic record playing systems. Such systems comprise the combination of record player, amplifier means and loudspeakers. Quite frequently however, the owner of an FM multiplex receiver does not own a stereophonic record playing system, and thus he is precluded from listening to his own stereophonic records. In order to listen to these records, such individual has heretofore been required to acquire a complete stereophonic system including record player, amplifier means and loudspeakers, thereby duplicating the amplifier means and loudspeaker associated with the FM multiplex receiver. However, by employing the present invention, such individual need acquire only a stereophonic record player in order to listen to his own stereophonic records, without acquiring additional amplifier means and loudspeakers. All that is required is that the record be broadcast from the record player through the apparatus of this invention, enabling the recorded signal to be received and reproduced by the FM multiplex receiver. The invention is also useful wherever a stereophonic record playing system is located remotely at a short distance from an FM multiplex receiver, and it is desired to listen to recordings at the receiver location without connecting unsightly wiring between the two locations.

*Summary of the invention*

One object of the invention is to provide a simple, inexpensive FM multiplex transmitter driven by electromechanical transducing elements.

Another object is to provide a low power FM multiplex transmitter for short range broadcasting of stereophonic recordings.

Briefly, in a preferred embodiment of the invention, a system for broadcasting stereophonic recordings is described wherein forces are applied to first and second electomechanical transducing elements in response to audio signals. The first transducing element amplitude modulates a first constant frequency signal in response to the audio signals and the second transducing element amplitude modulates a DC signal in response to the audio signals. Means are provided for combining the amplitude modulated output signal of the first transducing element with the amplitude modulated signal of the second transducing element and a third constant frequency signal. Transmitter means are also provided for generating an FM multiplex signal modulated in response to the combining means.

*Brief description of the drawings*

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

*Description of the preferred embodiments*

Figure 1:
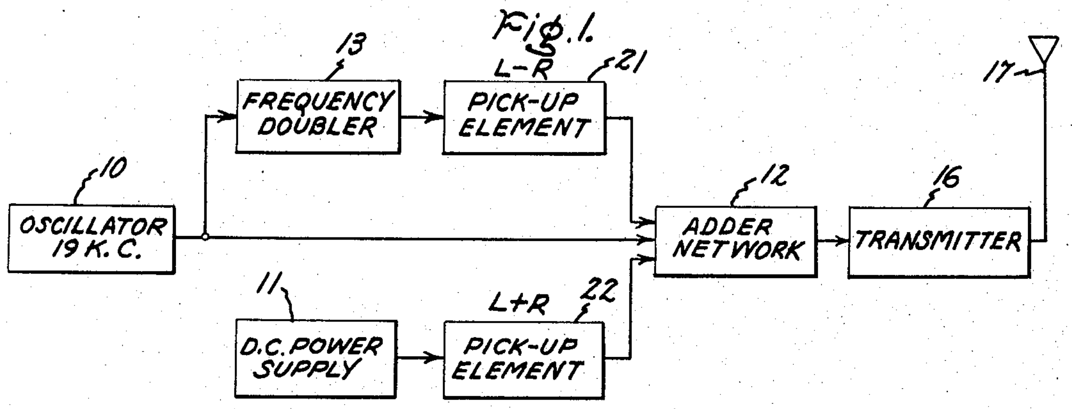
FIGURE 1 is a block diagram of the FM multiplex transmitting system of the instant invention.

In FIGURE 1, the transmitting system is illustrated as being driven from a 19 kilocycle per second (kc.) oscillator 10 and a DC power supply 11. Oscillator 10 provides a 19 kc. pilot signal to one input of an adder network 12 and a 38 kc. driving signal to a phonograph pick-up element 21 through a frequency doubler 13. The 38 kc. signal is utilized as a carrier which is amplitude modulated by pick-up element 21 and furnished to a second input of adder network 12. The 38 kc. carrier signal may be suppressed, if so desired in the system, by any of several means well-known in the art. A second phonograph pick-up element 22 supplies an amplitude modulated signal to a third element of adder network 12.

Adder network 12, in its simplest form, may comprise a conventional resistance network employed as an adding matrix wherein the three input signals are algebraically added to produce a single output signal which frequency modulates a transmitter 16 driving an antenna 17. Phonograph pick-up elements 21 and 22 comprise strain transducing elements which may conveniently be of the piezoresistive type, shown and described in G. E. Fenner patent application, Ser. No. 561,472, filed June 29, 1966, and asigned to the instant assignee.

Transmitter 16 is preferably of a low power variety, such as the type employing a tunnel diode in the oscillator stage. A typical tunnel diode transmitter adaptable for use with the invention is illustrated and described on page 41 of the General Electric Tunnel Diode Manual, First Edition, 1961.

Although a 19 kc. oscillator is shown generating both the 19 kc. pilot signal and the 38 kc. signal for pick-up element 21, this arrangement is utilized for convenience only. Alternatively, it is also feasible to eliminate frequency doubler 13 and to substitute a 38 kc. oscillator as the carrier source which is amplitude modulated by pick-up element 21.

The letters L and R as used in FIGURE 1 represent audio signals emanating from the left and right directions, respectively. In a phonographic recording, the audio signal represented by the letter L originates from a microphone situated at the left side of a sound stage or recording booth. For realistic reproduction, the L signal is reproduced by loudspeaker apparatus situated on the left side of the listener. Similarly, the audio signal designated R originates from a microphone on the right, and is therefore reproduced from loudspeaker apparatus on the right side of the listener.

The channel designated $L+R$ is the one ordinarily received by conventional monaural FM receivers when stereophonic signals are broadcast. Thus, the multiplex system preserves to the listener using a conventional FM receiver full utility for his equipment because the signals representing the left and right directions are added together as though received by a single omnidirectional microphone at the originating station. However, for use in FM multiplex receivers, there is provided an additional channel carrying $L-R$ signals. The $L-R$ information is amplitude modulated and appears in two sidebands disposed on either side of the 38 kc. carrier signal.

In the receiver, when receiving FM multiplex signals wherein the 38 kc. carrier is suppressed, it is necessary to internally generate a 38 kc. signal corresponding to the original suppressed 38 kc. carrier signal, in order to recover the information contained in the $L-R$ channel. Thus, in the typical FM multiplex receiver, the 19 kc. pilot signal, which lies between the frequency bands of the $L+R$ and $L-R$ information channels so as to avoid interference therewith, is extracted for the purpose of synchronizing a 19 kc. oscillator thereto. The 19 kc. oscillator frequency is doubled to provide a 38 kc. signal. Hence the pilot signal not only phase-controls the local oscillator of the receiver, but also facilitates reconstitution of the suppressed carrier signal, which is essential to proper receiver operation. Additional details regarding this mode of receiver operation may be found in G. E. Fenner U.S. Patent No. 3,278,686, issued Oct. 11, 1966, and assigned to the instant assignee. When the signal received is that transmitted by the system of FIGURE 1 however, the 38 kc. carrier signal is supplied to the receiver as part of the received signal. In such case, the internally generated 38 kc. signal is exactly in phase with the received 38 kc. signal and is therefore not utilized.

To briefly recapitulate operation of the system of FIGURE 1, oscillator 10 furnishes a 19 kc. signal to adder network 12. This signal is combined with a 38 kc. signal which is supplied from frequency doubler 13 and is amplitude modulated with $L-R$ information by pick-up element 21. In addition, an audio signal representative of $L+R$ information is supplied by pick-up element 26 to adder network 12. The combined output from adder network 12 frequency modulates transmitter 16 which radiates the frequency modulated signal at low power from antenna 17.

Figure 2:
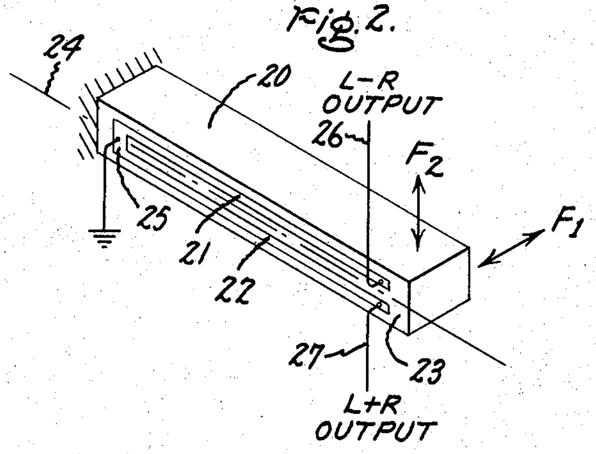
FIGURE 2 is an isometric view of the strain transducing pick-up intended for use with the transmitting system of the instant invention.

FIGURE 2 illustrates a piezoresistive pick-up element 20 which may conveniently be used with the system of FIGURE 1. This element is described in detail in the aforementioned G. E. Fenner application, Ser. No. 561,-472. Basically, however, pick-up element 20 is comprised of a cantilever-mounted semiconductor crystal wherein the free end is displaced by forces responsive to a stylus (not shown) riding in the groove of the phonograph record being reproduced. One of the crystal faces 23 lies in a plane perpendicular to the direction of a first of two applied forces $F_1$ and parallel to the direction of the second of the forces $F_2$. Two parallel strips, which comprise low resistivity portions of the crystal, are directed longitudinally along the face, and orthogonally to the direction of each of the applied forces. Accordingly, resistance values of strips 21 and 22 are affected substantially identically in response to forces $F_1$ and substantially oppositely in response to forces $F_2$. Because uniformly-produced elements 21 and 22 are spaced equally distant from longitudinal centerline 24 of crystal face 23, and are of equal resistance when undergoing zero strain, the absolute values of resistance change due to any applied strain in elements 21 and 22 are equal. For convenience in circuit connections, the grounded ends of elements 21 and 22 may be joined together on face 23 by a short, low resistivity connecting element 25. A pair of leads 26 and 27 are attached to strips 21 and 22 respectively at the unconstrained end of element 23. Thus, lead 26 carries the $L-R$ output signal while lead 27 carries the $L+R$ output signal. It should be noted that stereophonic recording, as commonly employed, produces forces $F_1$ and $F_2$ which vary with the left channel signal L and the right channel signal R respectively. In other words, force $F_1$ corresponds to the L audio signals while force $F_2$ corresponds to the R audio signals.

Figure 3:
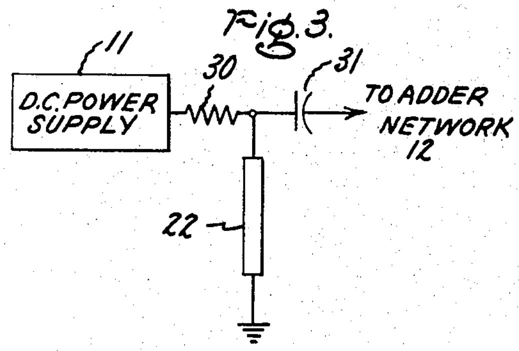
FIGURE 3 is a schematic diagram of one of the pick-up elements used in the transmitting system of FIGURE 1.
Figure 4:
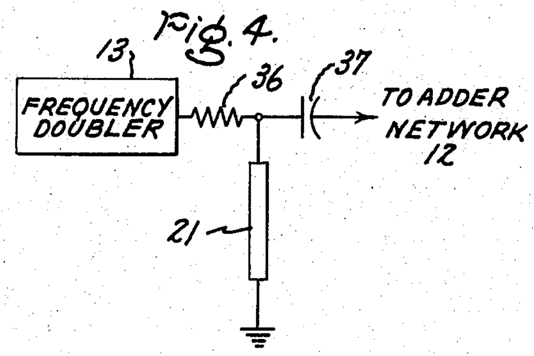
FIGURE 4 is a schematic diagram of the other of the pick-up elements used in the transmitting system of FIGURE 1.

FIGURES 3 and 4 illustrate how regions 21 and 22 of pick-up element 20 of FIGURE 2 are connected into the system of FIGURE 1. Thus, in FIGURE 3, low resistivity element 22 is energized from DC power supply 11 through a current limiting resistance 30. Output to added network 12 is furnished through a DC blocking capacitance 31. Thus, it can be seen that changes in resistivity of element 22 caused by application of forces $F_1$ and/or $F_2$ on crystal 20 of FIGURE 2 produce corresponding variations in DC voltage across element 22. The DC component of this varying voltage is removed by capacitance 31, so that the voltage furnished to adder network 12 from low resistivity element 22 comprises an AC voltage varying in both amplitude and frequency in accordance with forces $F_1$ and $F_2$. Thus, the $L+R$ pick-up element furnishes a direct reproduction of the $L+R$ audio channel to adder network 12.

As shown in FIGURE 4, a 38 kc. signal is supplied from frequency doubler 13 to low resistivity element 21 through a current limiting resistance 36. Thus, a 38 kc. signal is supplied across resistance 21, and is amplitude modulated thereby due to the changes in resistance of element 21 in accordance with forces $F_1$ and $F_2$. Therefore, an amplitude modulated 38 kc. signal, which appears across low resistivity element 21, is furnished through a DC blocking capacitance 37 to adder network 12.

The foregoing describes a low power FM multiplex system for transmitting a radio signal from a stereophonic transducer element. The system is simple and inexpensive, and enables short-range broadcasting of stereophonic recordings reproduced by a stereophonic record player.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. In an FM multiplex system for transmitting stereophonic audio signals, the combination comprising:

first and second electromechanical transducing elements positioned to be acted upon by forces in response to audio signals;

said first electromechanical transducing element amplitude modulating a first constant frequency signal in responce to said audio signals, said second electromechanical transducing element amplitude modulating a DC signal in response to said audio signals;

means combining the amplitude modulated output signal of said first electromechanical transducing element with the amplitude modulated output signal of said second electromechanical transducing element and a second constant frequency signal; and transmitter means responsive to said combining means and generating an FM multiplex signal in accordance therewith.

2. The FM multiplex system of claim 1 wherein the frequency of said first constant frequency signal is twice the frequency of said second constant frequency signal.

3. The FM multiplex system of claim 1 wherein said first and second electromechanical transducing elements comprise piezoresistive elements.

4. The FM multiplex system of claim 3 wherein said piezoresistive elements are formed in a semiconductor crystal, one end of said crystal being stressed by said forces in response to recorded audio signals.

5. The FM multiplex system of claim 3 wherein the frequency of said first constant frequency signal is twice the frequency of said second constant frequency signal.

6. In an FM multiplex system for transmitting stereophonic audio signals, the combination comprising:

first and second piezoresistive elements positioned to be strained by forces in response to recorded audio signals;

oscillator means;

frequency multiplying means coupling said oscillator means to the first of said piezoresistive elements;

means furnishing a DC signal to the second of said piezoresistive elements;

an adder network responsive to output signals from said oscillator means and said first and second piezoresistive elements; and transmitter means responsive to said adder network and generating an FM multiplex signal in accordance therewith.

7. The FM multiplex system of claim 6 wherein said first and second piezoresistive elements comprise low resistivity strips disposed through the face of a semiconductor crystal.

8. The FM multiplex system of claim 7 wherein said crystal is cantilever-mounted, said strips extending between the free and constrained ends of said crystal, and said forces being applied to said crystal close to the free end thereof.

References Cited

UNITED STATES PATENTS

| | | | |
|---|---|---|---|
| 3,122,610 | 2/1964 | Csicsatka | 179—155 |
| 3,144,522 | 8/1964 | Bernstein | 179—100.41 |

ROBERT L. GRIFFIN, *Primary Examiner.*